(12) United States Patent
Searfoss

(10) Patent No.: US 10,434,851 B2
(45) Date of Patent: Oct. 8, 2019

(54) GLIDING PIVOT

(71) Applicant: Aero Industries, Inc., Indianapolis, IN (US)

(72) Inventor: Timothy K. Searfoss, West Branch, MI (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 15/961,273

(22) Filed: Apr. 24, 2018

(65) Prior Publication Data

US 2018/0236855 A1 Aug. 23, 2018

Related U.S. Application Data

(63) Continuation of application No. 15/390,258, filed on Dec. 23, 2016, now Pat. No. 9,969,248, which is a continuation-in-part of application No. 15/252,831, filed on Aug. 31, 2016, now Pat. No. 10,023,033.

(60) Provisional application No. 62/387,563, filed on Dec. 24, 2015.

(51) Int. Cl.
*B60J 7/08* (2006.01)

(52) U.S. Cl.
CPC .......... *B60J 7/085* (2013.01); *B60Y 2400/14* (2013.01); *B60Y 2400/406* (2013.01); *B60Y 2410/104* (2013.01)

(58) Field of Classification Search
CPC .................................. B60J 7/085; B60J 7/068
USPC ............................................... 296/100.18, 98
See application file for complete search history.

(56) References Cited

U.S. PATENT DOCUMENTS

| | | |
|---|---|---|
| 6,257,646 B1 | 7/2001 | Searfoss |
| 6,659,531 B2 * | 12/2003 | Searfoss .................. B60J 7/085 296/100.17 |
| 8,465,080 B2 | 6/2013 | Searfoss |
| 9,446,656 B2 | 9/2016 | Alder |

* cited by examiner

*Primary Examiner* — Joseph D. Pape
(74) *Attorney, Agent, or Firm* — Maginot, Moore & Beck, LLP

(57) ABSTRACT

A cover system includes a cover, two bail arms, and a fluid circuit. Each bail arm is mounted on a gliding assembly. Each gliding assembly includes a gliding body slidably supported on a vehicle frame, and a cylinder connected to the gliding body and defining first and second ends. The fluid circuit is configured to supply fluid to the first end of the first cylinder and the second end of the second cylinder. A fluid line connects the second end of the first cylinder to the first end of the second cylinder and is configured to direct the fluid between the cylinders such that a flow of the fluid to the first cylinder causes movement of the cylinders, gliding bodies, and bail arms in a first direction, and a flow to the second cylinder causes movement of the cylinders, gliding bodies, and bail arms in a second opposite direction.

10 Claims, 11 Drawing Sheets

GLIDING PIVOT

PRIORITY CLAIM AND REFERENCE TO RELATED APPLICATION

This application is a continuation of co-pending U.S. application Ser. No. 15/390,258 (the '258 Application), entitled "Gliding Pivot", filed on Dec. 23, 2016, the entire disclosure of which is incorporated herein by reference, which claims priority to and is a non-provisional filing from U.S. provisional application No. 62/387,563, filed on Dec. 24, 2015, the entire disclosure of which is incorporated herein by reference, and which is also a continuation-in-part of co-pending U.S. application Ser. No. 15/252,831 (the '831 Application), entitled "Cover System for Open-Topped Containers", filed on Aug. 31, 2016, the entire disclosure of which is incorporated herein by reference.

BACKGROUND

The present disclosure generally relates to cover systems, and more particularly relates to a gliding pivot for a cover system.

Cover systems for trucks are widely known. Such systems can use bows or arms having stationary or movable pivots for extending a flexible cover, or tarpaulin, over the open top of a container body. Roll-off container trucks, however, present special problems for cover systems. In particular, such container trucks tend to have differently sized beds, and are required to accept containers of different dimensions. To accommodate these variances, the arms normally used in conventional truck bed covers have to be long enough to reach from their mounting point to both the front and rear ends of the truck bed, regardless of the overall length of the bed. U.S. Pat. No. 5,292,169 shows one typical prior truck container cover system in which the cove system is limited to a particular length. Such cover systems are not able to efficiently accommodate containers of different sizes. Newer cover systems have developed that incorporate a sliding pivot for the cover bow, such as the system disclosed in U.S. Pat. No. 6,257,464 to Searfoss, the entire disclosure of which is incorporated herein by reference. In systems of this type, the pivot point for the cover bow can be shifted along the length of the vehicle.

FIG. 1 shows one example of a cover system 10 for a hauling truck T. The cover system includes a cover assembly 12 that includes a flexible cover mounted on a roller on which the cover is rolled in a stowed or retracted configuration and from which the cover is extended. The flexible cover is carried by a pair of bail arms 14 mounted on opposite sides of the vehicle frame F, with the bail arms and cover sized and configured to span the length of a container carried by the hauling truck. The bail arms thus straddle a container rolled onto the frame F. Each bail arm can include a lower arm 15 and an upper arm 16 connected by a knuckle pivot 18. The lengths of the bail arm segments are calibrated to be able to extend the cover over the entire roll-off container while maintaining the cover in sufficient tension in the open position.

The bail arms 14 are mounted at a pivot mechanism 20 to a sliding mechanism 22. The pivot mechanism 20 includes components to exert a torque on the bail arms to pivot the arms from the closed position shown in FIG. 1 to an open position spanning the open top of the roll-off container. The sliding mechanism 22 is configured to slide the pivot mechanism in the longitudinal direction 24 relative to the vehicle frame F as the pivot mechanism 20 pivots the bail arms. This feature allows the bail arm to span the length of any container supported on the frame.

Sliding pivot systems are often cumbersome and difficult to control. There is a need for an improved sliding pivot cover system that can accommodate containers having different lengths and that provides for smooth extension and retraction of the flexible cover.

SUMMARY OF THE DISCLOSURE

A cover system for a vehicle having a frame for supporting a container includes a flexible cover assembly, a pair of bail arms connected to one end of said flexible cover, and a corresponding pivot mechanism for pivotably supporting each bail arm. Each pivot mechanism is configured to pivot the bail arms between a stowed position and a closed position in which the flexible cover spans the length of the container. Each pivot mechanism is mounted on a corresponding gliding assembly, and each gliding assembly includes a pair of oppositely disposed rails fixedly mounted to the frame of the vehicle, a gliding body slidably supported on the pair of rails, and a cylinder supporting the gliding body and slidably supported on a rod assembly. The rod assembly includes a pair of collinearly disposed rods, coupled together by a piston element, the piston element defining opposite fluid paths for a pressurized fluid conveyed under pressure to the cylinder. A fluid circuit is configured to selectively supply pressurized fluid to each cylinder through the pair of rods to move the cylinder, and therefore the gliding body and bails arms supported thereon, in one of two opposite directions along the length of the vehicle frame.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
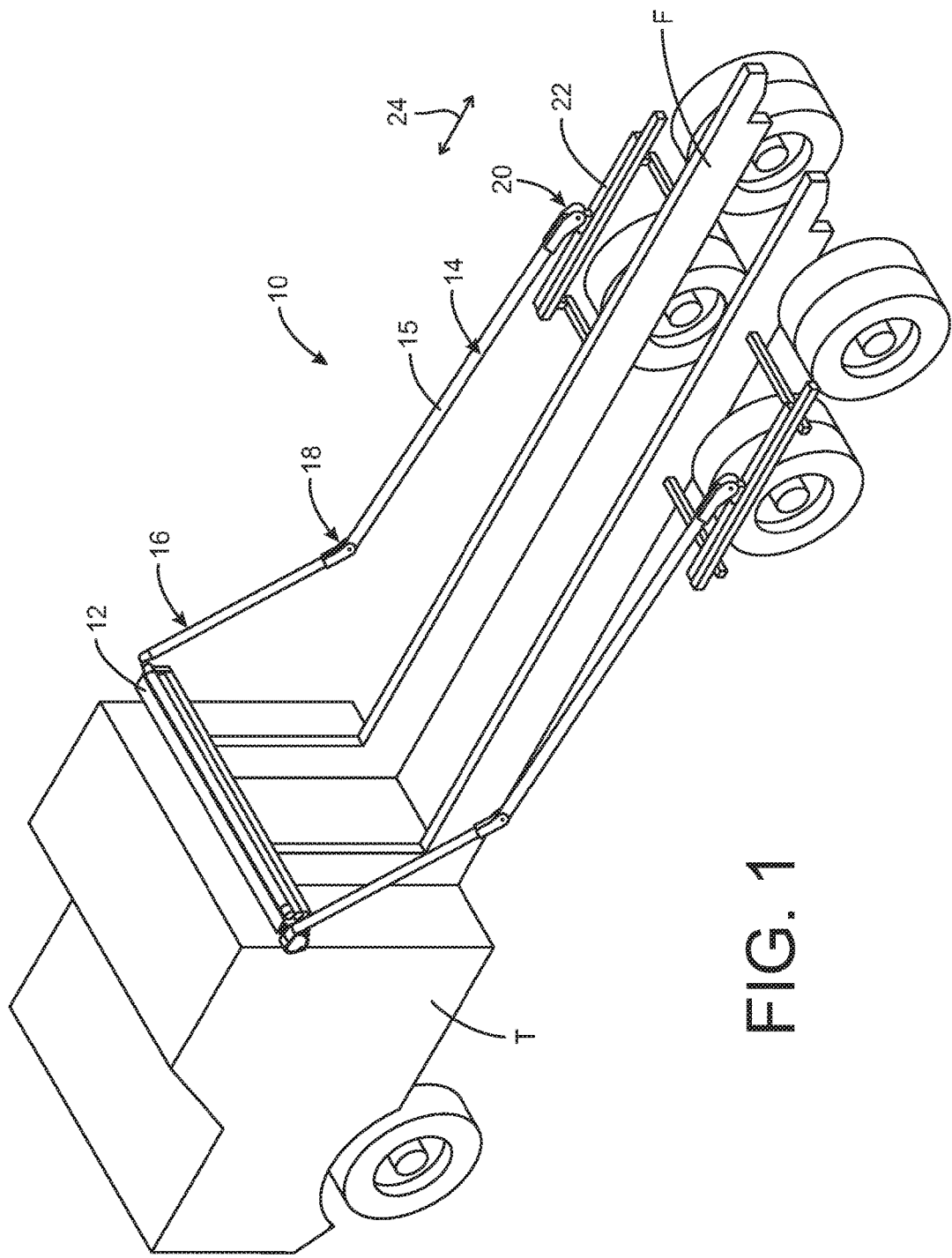
FIG. 1 is a perspective view of a truck for hauling a roll-off container with a cover system mounted thereon.
Figure 2:
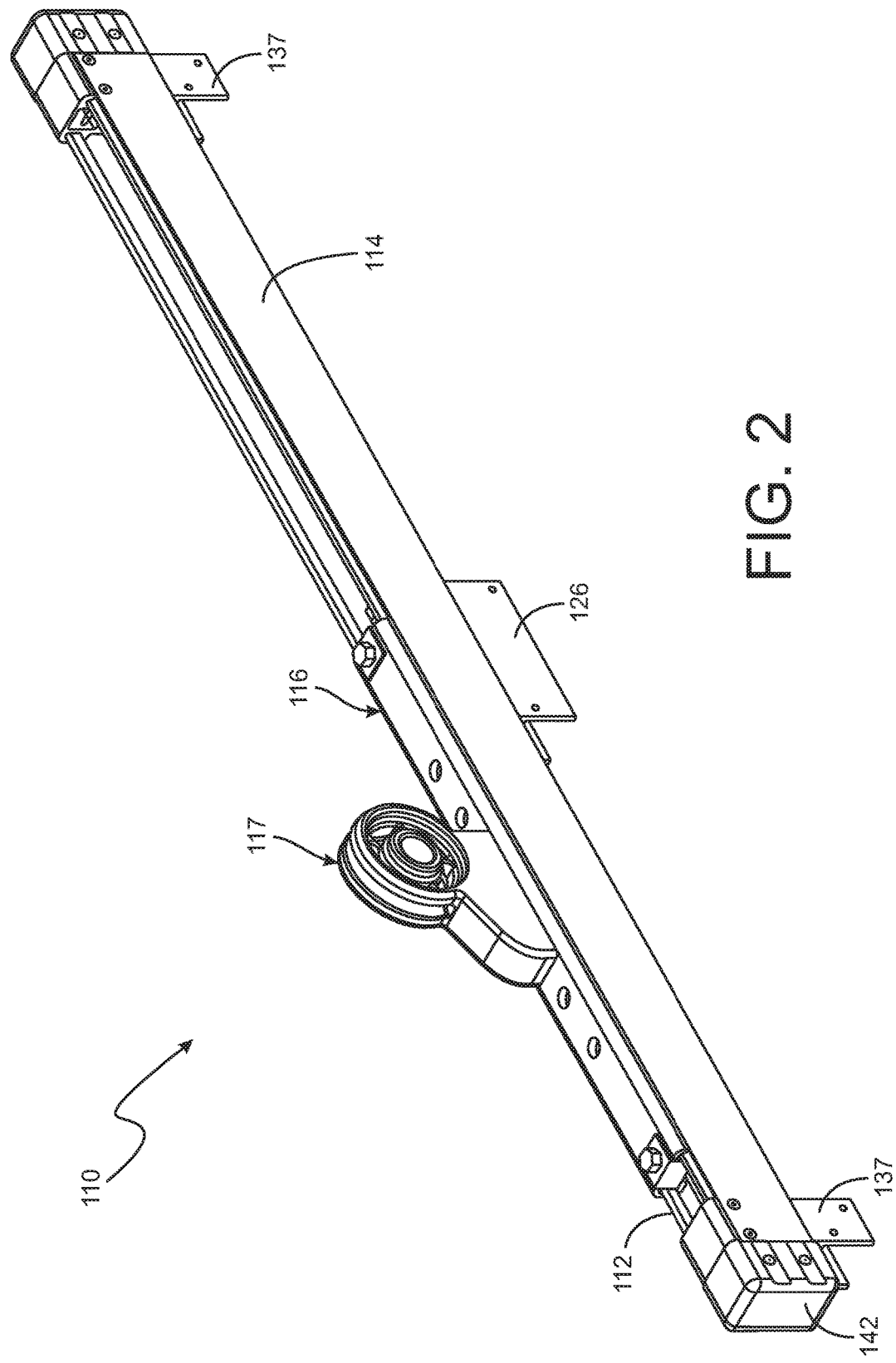
FIG. 2 is a perspective view of a gliding pivot for covering a load, according to embodiments of the present disclosure.

FIGS. 2-6 show a sliding or gliding pivot assembly 110, a pair of which in one embodiment may be used in a cover system for trucks, such as to replace the sliding mechanism 22 shown in FIG. 1. The gliding pivot assembly 110 includes rails 112 and 114 and a gliding assembly 116 slidably mounted on the rails. The gliding assembly 116 includes a gliding body 120 on which is mounted a pivot base 117 which pivotably supports the bail arm of the cover assembly, such as the bail arm 14 shown in FIG. 1. Polymer bushings 118 may be situated between the gliding body 120 and the rails 112 and 114 to provide a reduced friction sliding interface. Angled aluminum retainers 122 and 124, one mounted on each end of the gliding body 120, hold the bushings 118 in place on the body. A centrally located belly pan 126 connects to bottom edge of the rails 112 and 114 to stiffen the gliding pivot assembly 110, and to provide a point for attachment to a vehicle body if necessary or desirable.

Figure 3:
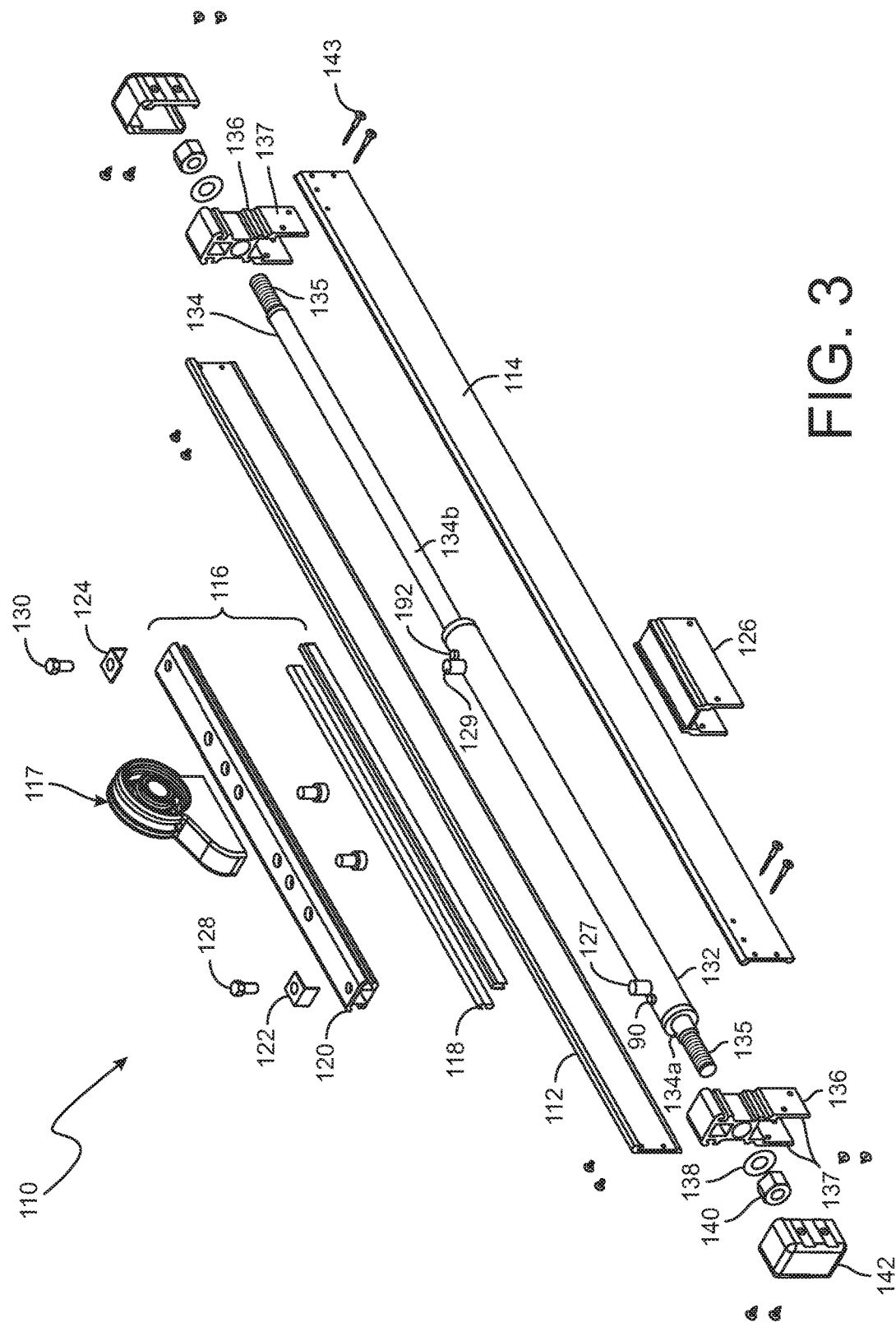
FIG. 3 is an exploded perspective view of the gliding pivot.

The gliding body 120 is connected to a cylinder 132 situated between the rails 112 and 114. The body is preferably mounted to the cylinder by bolts 128 and 130 threaded into mounting bosses 129, 130 at the opposite ends of the cylinder, as shown in FIG. 3. The same bolts may also fasten the retainers 122, 124 to the gliding body 120, passing through mounting holes in the body to engage the mounting bosses. The cylinder 132 is movable along a fixed rod assembly 134. The rod assembly 134 includes two rod halves 134a, 134b that are connected inside the cylinder 132 by a piston element 150, shown in FIG. 7. The rod halves are hollow with internal threads to receive external threads 152 of the piston element 150. The rod halves may be additionally or optionally welded or otherwise permanently fastened to the piston element. Each of the rod halves 134a, 134b also includes a threaded end 135 that extends through an end mount 136, a washer 138 and into engagement with a corresponding nut 140 to fix the rod assembly 134 to the rails, and ultimately to the vehicle. The end mounts 136 include mounting flanges 137 for attachment to the vehicle, such as the frame F of the vehicle T shown in FIG. 1. A cap 142 is affixed to each end of the rails 112, 114 to cover each end of the rod 134.

Figure 5:
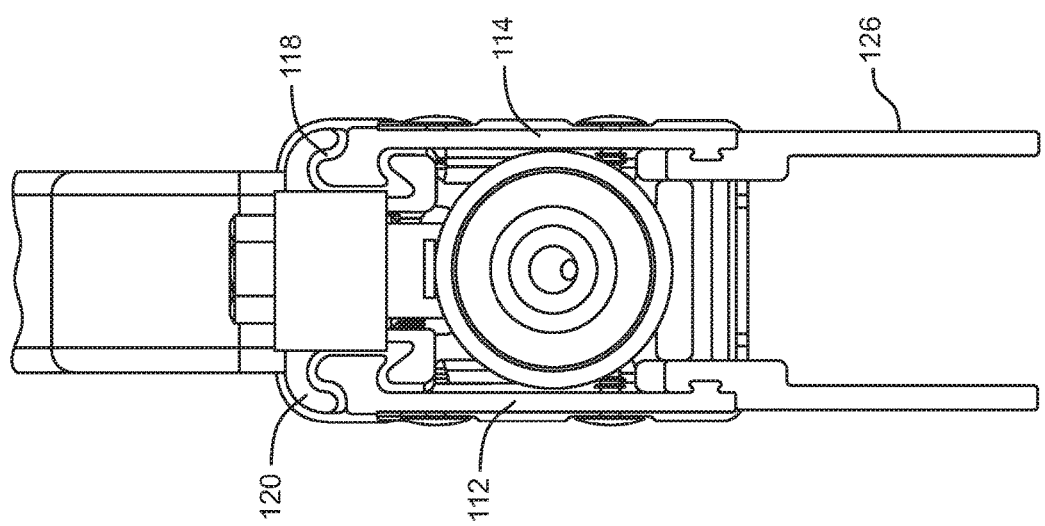
FIG. 5 is an end cross sectional view of a slide assembly of the gliding pivot.
Figure 6:
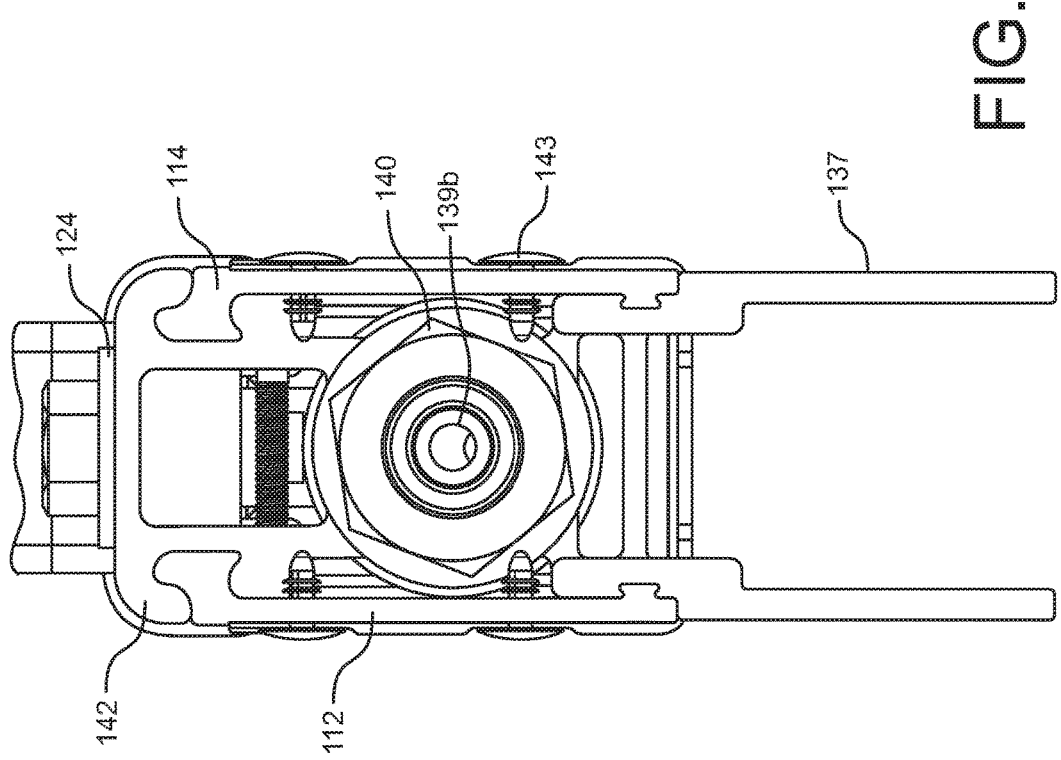
FIG. 6 is another end cross sectional view of the slide assembly.

As illustrated in FIGS. 5-6, the rails 112, 114 and gliding body 120 are configured for dovetail engagement at the upper edge of the rails. The bushings 118 are similarly configured to be seated within the dovetail joint of the rails and the gliding body, as best shown in FIG. 5. Similarly, the end mounts 136 and the end caps 142 are configured for a dovetail joint engagement with the upper and lower edges of the rails 112, 114, as depicted in FIG. 6. The end caps 142 may be fastened to the rails with screws, pop-rivets or similar fasteners 143. The belly pan 126 is configured for a dovetail joint engagement with the lower edge of the rails. For strength purposes, the rails, gliding assembly, belly pan and end mounts are preferably formed of a metal, such as aluminum or steel. The end cap 142 may be formed of a durable plastic.

The piston element 150 includes a cylindrical body 151 with a cylindrical surface 153 configured for fluid-tight engagement with inner surface of the moving cylinder 135. Sealing rings 153a may be provided in the cylindrical surface 153 to ensure a fluid-tight engagement with the moving cylinder. The cylinder 132 includes bleed fittings 190 and 192 in the top side of the cylinder to assist in removing the fluid from the system, which may be done manually. The bleed fittings 190 and 192 may be configured to be loosened with an Allen wrench.

Figure 4:
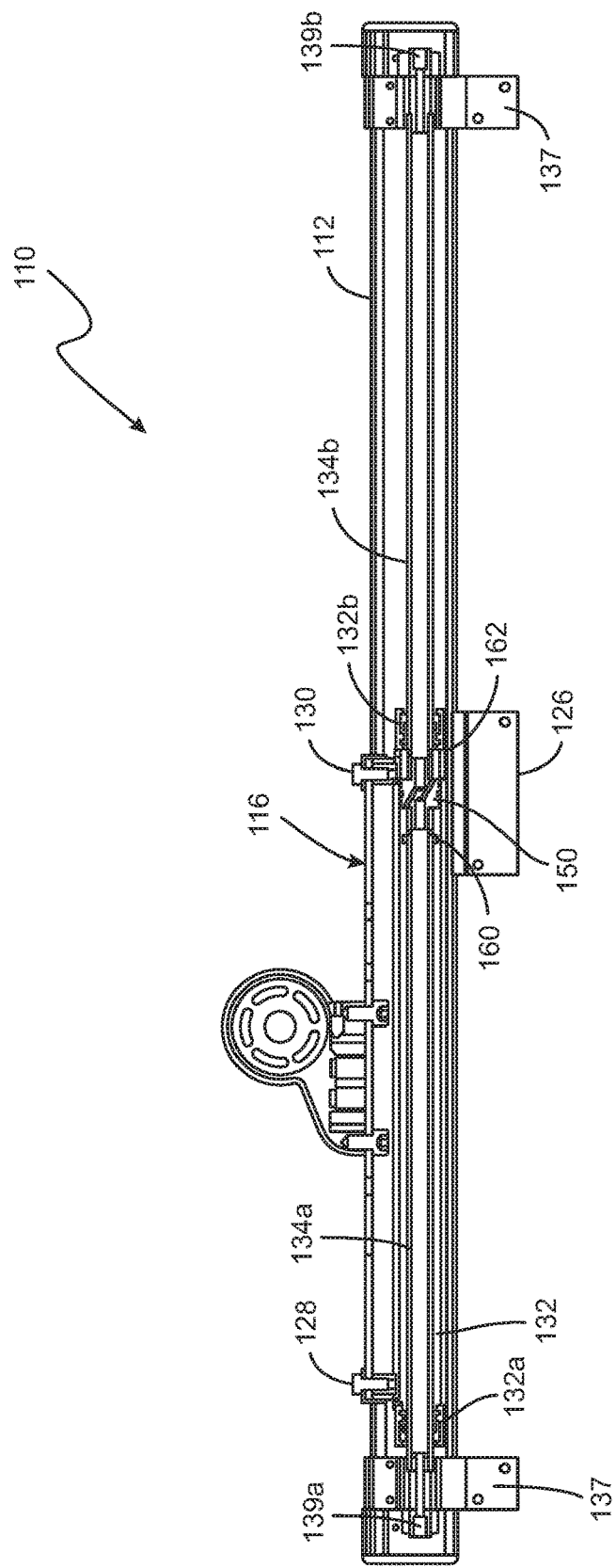
FIG. 4 is a side cross sectional view of the gliding pivot.
Figure 7:
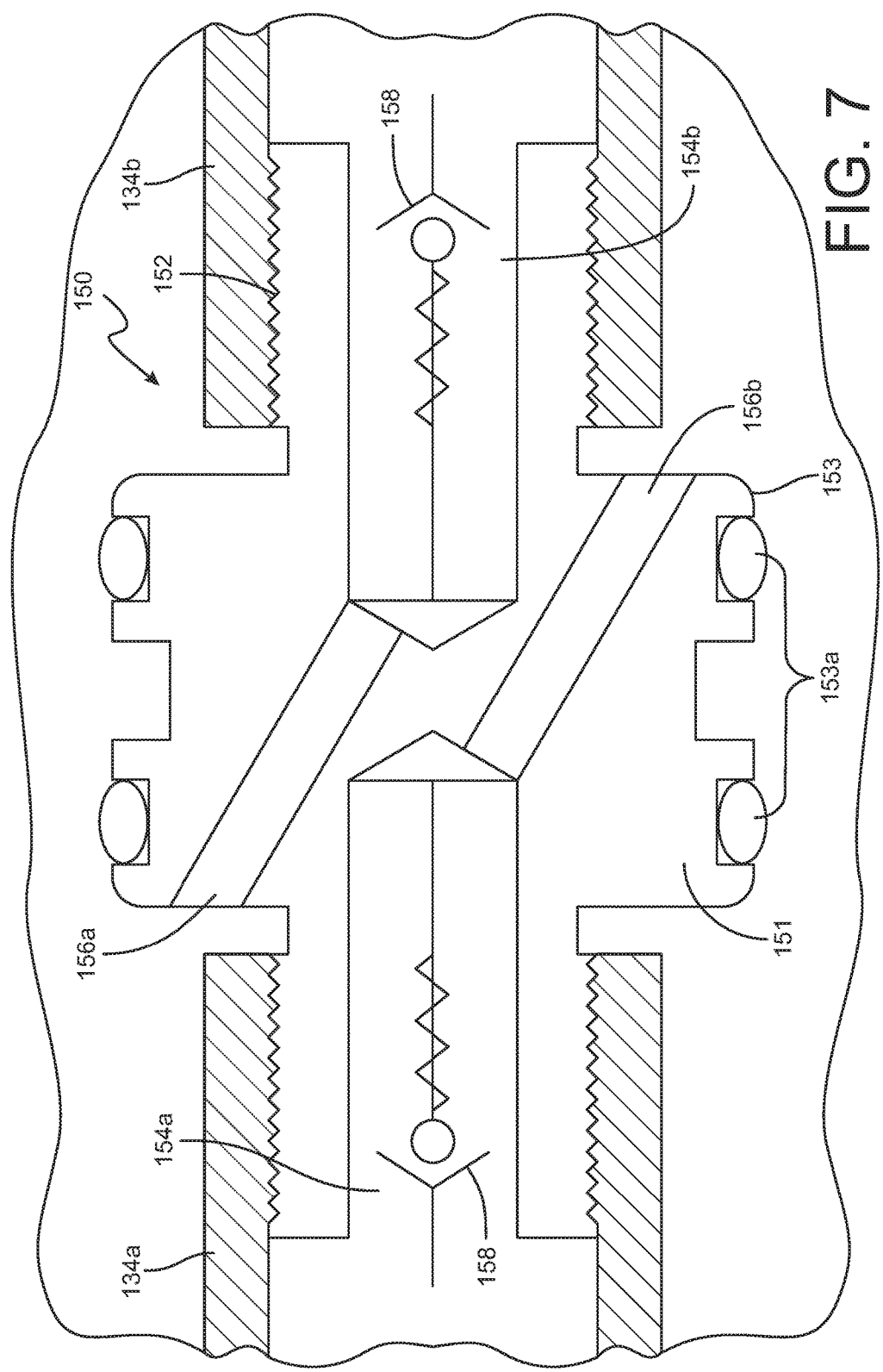
FIG. 7 is a cross sectional view of a piston for a sliding cylinder of the gliding pivot.

The gliding pivot 110 has an automatic synchronization function built inside the cylinder 132. As shown in FIG. 7, each end of the piston 150 has a central bore 154a, b and an accompanying angled fluid release port 156a, b. The central bores 154a, b communicate with the hollow interior of the rod halves 134a, 134b, and the hollow interiors of the rod halves are connected by end fittings 139a, b to a hydraulic circuit, such as the circuit shown in FIG. 10. Fluid is directed through the rod halves 134a, 134b, into the piston 150 and into the interior of the cylinder 132 by way of the angled ports 156a, 156b. Since the piston 150 and rod halves 134a, 134b are fixed relative to the vehicle, differential fluid pressure acting on the interior sealed ends 132a, 132b of the cylinder 132 determines the direction of movement of the cylinder, and ultimately of the gliding assembly 116 and pivot base 117 relative to the vehicle. Movement of the cylinder relative to the rod halves is limited by stops 160, 162 affixed to the interior ends of the rod halves 143a, 134b as shown in FIG. 4.

Figure 8:
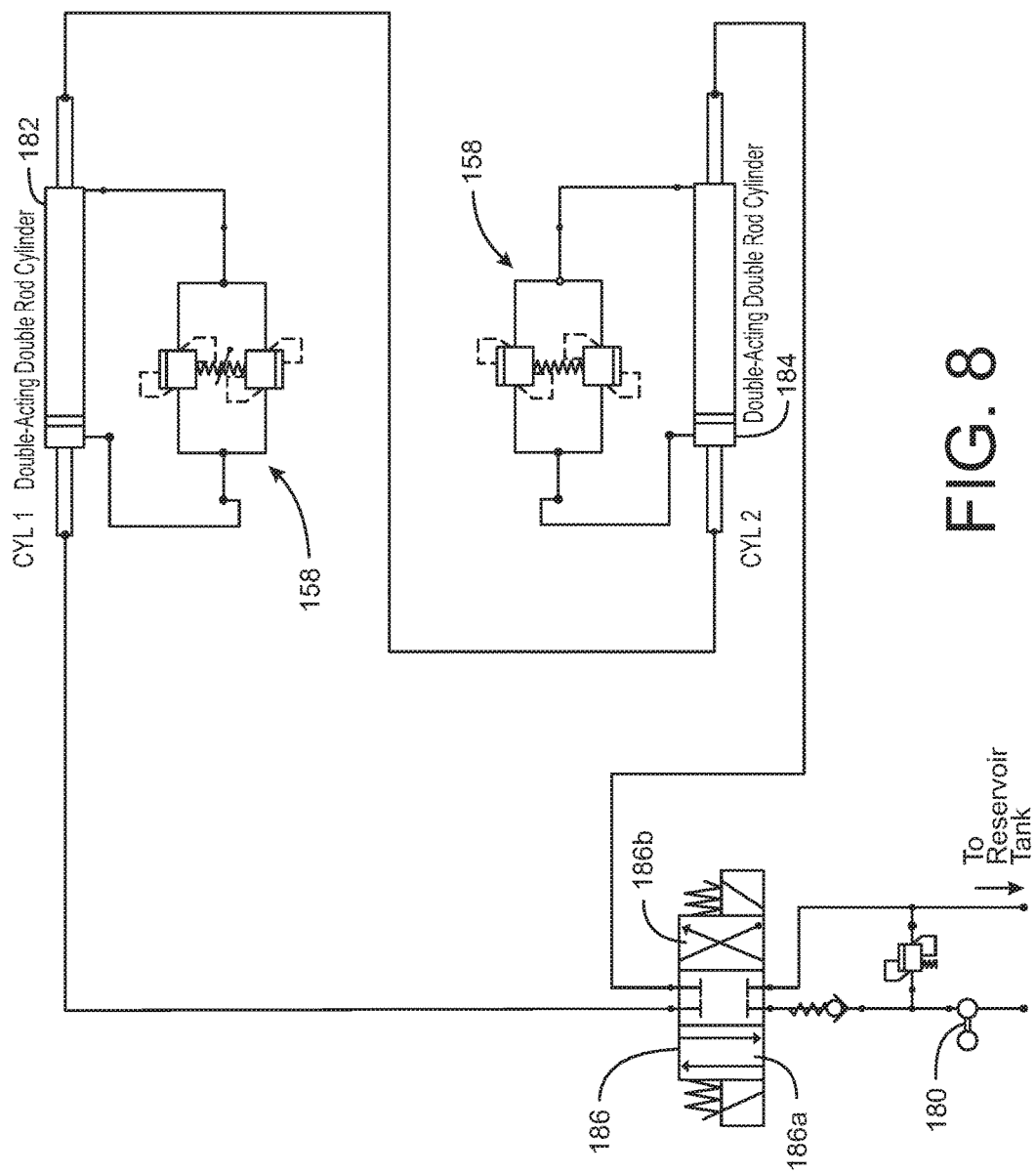
FIG. 8 is a schematic view of a hydraulic circuit for use with the gliding pivot.

The central bores 154 of the piston 150 may be configured to accommodate spring loaded check valves 158 (shown schematically) that stop fluid flow in one direction, namely exiting the angled release ports 156a, b, as shown in FIG. 7. FIG. 8 shows a hydraulic circuit for use with the gliding pivot of the present disclosure. A pump 180 sends fluid to one end of a cylinder 182 when the solenoid valve 186 is in position 186a, or to one end of an opposite cylinder 184, when the solenoid valve is in position 186b. Fluid flow from the pump to the first cylinder 182 produces gliding movement of both cylinders in one direction, while fluid flow from the pump to the other cylinder 184 produces gliding movement of both cylinders in the opposite direction. The cylinders 182, 184 may be configured like the cylinder 132 depicted in FIG. 3, with one cylinder 182 on the left side of the vehicle and the opposite cylinder 184 on the right side to control the movement of a respective bail arm of the cover system, as shown in FIG. 1. The cylinder to which fluid is pumped may be referred to as the powered side or cylinder, and the opposite cylinder may be referred to as the slave side or cylinder. If the powered side reaches the end of its travel, such as by the cylinder contacting a stop 160, 162, but the slave side has not reached the end of its travel, the resulting pressure differential opens the check valve 158. This allows oil to flow from the powered side to the slave side until the slave cylinder reaches its end of travel, thus synchronizing the cylinders 182 and 184. Once both cylinders are at end of travel, they stop moving. Should the slave cylinder reach end of travel first, the spring loaded check valve 158 dumps fluid back to a reservoir tank until the powered cylinder reaches end of travel.

In one embodiment, the gliding pivot assembly 110 is configured for a range of travel of about twenty eight inches between the stops 160, 162. The end mounts 136 and belly pan 126 may be configured to be mounted to a two and a half inch square tube forming part of frame F.

The fluid in the circuit shown in FIG. 8 as well as the cylinder 132 can be air, in which case the fluid circuit is a pneumatic circuit, or oil, in which case the circuit is a hydraulic circuit. In the case of a pneumatic circuit, the pump does not require a reservoir tank, since the pump can draw in ambient air. In the case of hydraulic circuit, the pump 180 is connected to a reservoir tank mounted to the vehicle frame F.

Figure 9:
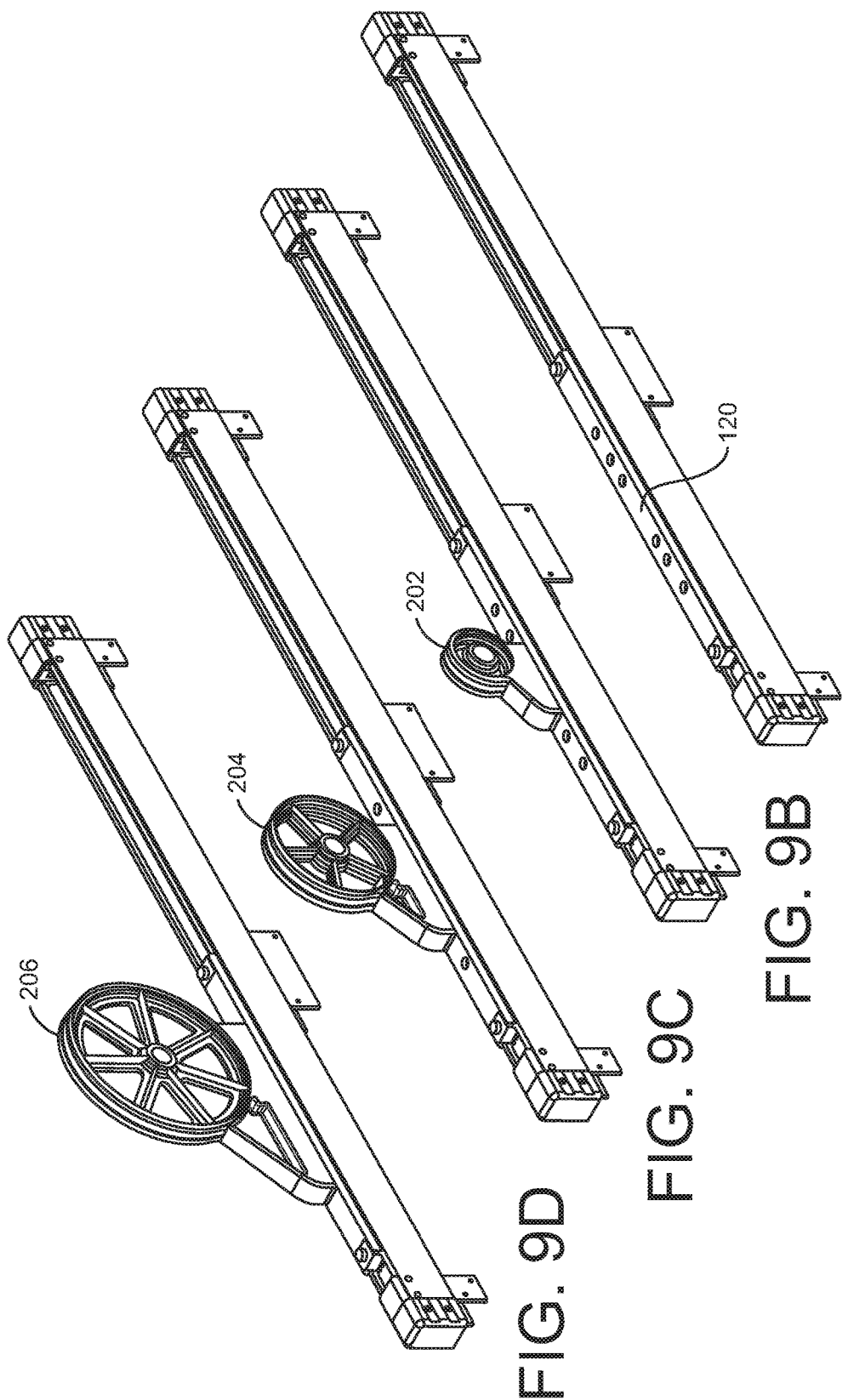
FIGS. 9a, 9b, 9c and 9d are perspective views of various embodiments of the gliding pivot.
Figure 10:
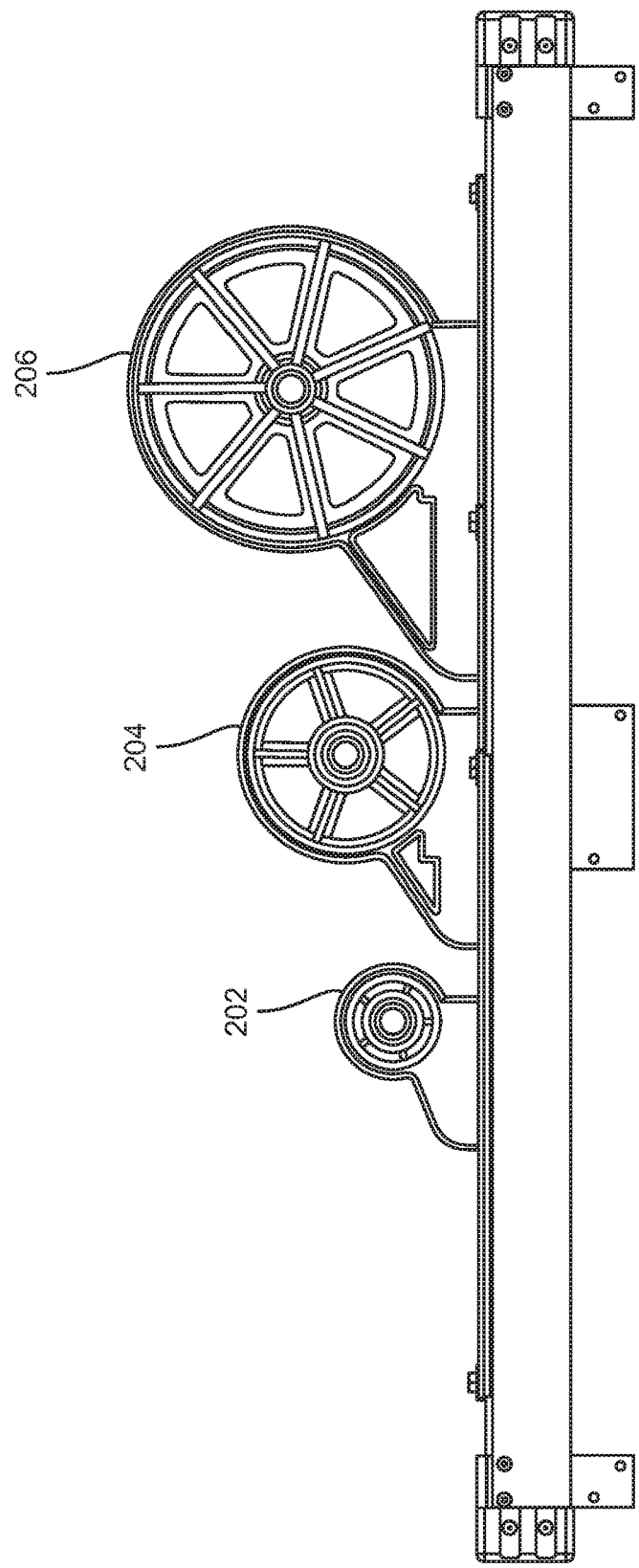
FIG. 10 is a side view showing various pivot bases for the gliding pivot of the present disclosure.
Figure 11:
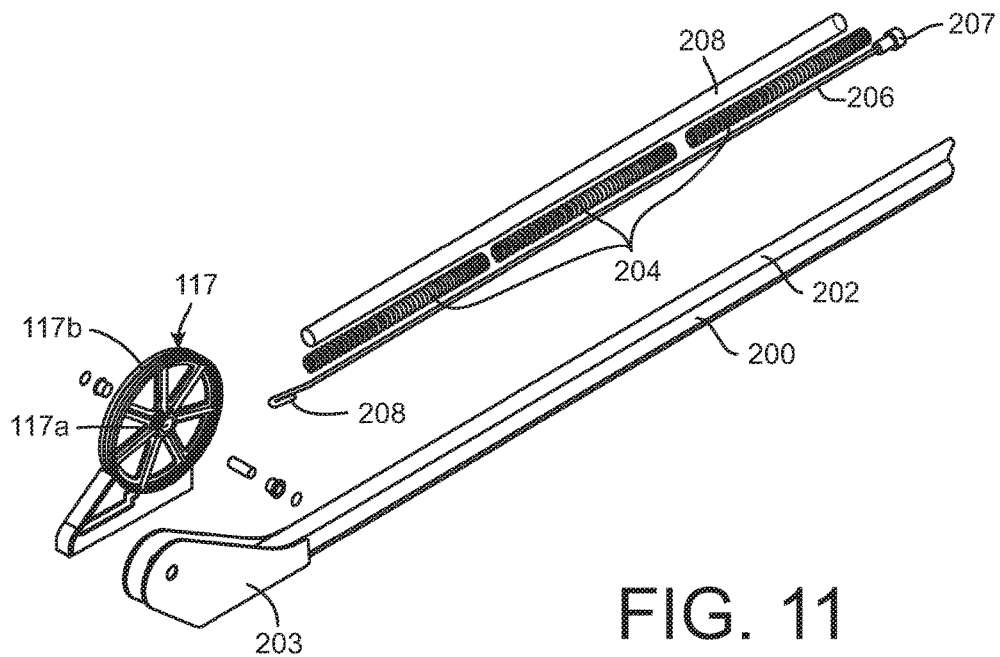
FIG. 11 is an exploded view of a bail arm as disclosed in the '831 Application for use with the gliding pivot assembly disclosed herein.
Figure 12:
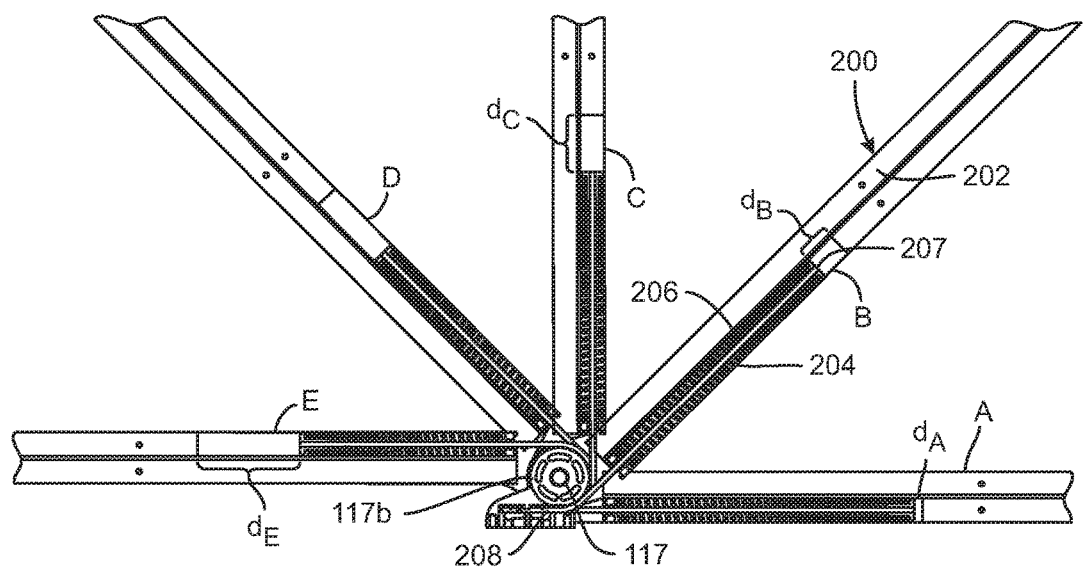
FIG. 12 is a side view showing the bail arm of the arm assembly shown in FIG. 11, depicting the arm in different positions between its closed position and its open position on the pivot base.

FIGS. 9 and 10 show various sizes and thus power ranges of pivot bases 202, 204 and 206 that may be mounted on the gliding body 120. The pivot bases 117, 202, 204, 206 may be configured and operate like the pivot bases disclosed in the '831 Application, incorporated by reference above. The bail arms 14 may further be configured like the bail arms disclosed in the '831 Application. In particular, the pivot bases and bail arms may be configured as shown in FIGS. 11-12. The bail arm may be configured as the bail arm 200 which incorporates a hollow tube 202 affixed to a mount 203 that is pivotably mounted to the hub 117a of the pivot base 117. A spring array 204 is disposed within the hollow tube 202, optionally protected by a sheath 208. A cable 206 extends through the springs with an end cap 207 bearing on the springs. The end 208 of the cable is affixed to the pivot base 117. As shown in FIG. 12, as the bail arm 200 pivots about the pivot base 117, the cable 206 wraps around the outer circumference of a pulley 117b of the pivot base, which gradually pulls the end cap 207, thereby compressing the spring assembly 204. As described in more detail in the '831 Application incorporated herein by reference, as the bail arm 200 pivots relative to the pulley 117b, the cable 206 wraps around successively more of the circumference of the pulley 117b. At the same time, the distance d of the end cap 207 from its initial position dA increases at each stage B-E. As can be appreciated, as the distance d increases, the spring assembly 204 is increasingly compressed between the moving end cap 207 and the fixed base 117. As the spring is compressed, the potential energy stored in the spring increases to its maximum value at the distance $d_E$. In one embodiment, the maximum travel can be about eight inches. In certain embodiments, the compression spring assembly 204 can provide 2000 pounds of force at the maximum compression travel distance Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A cover system for a vehicle, the vehicle having a frame for supporting a container, the cover system comprising:
   a flexible cover sized to span the length of the container;
   a pair of bail arms connected to one end of said flexible cover, each of said bail arms pivotably mounted on a corresponding one of a pair of gliding assemblies and configured to move the cover along the length of the container as the pair of bail arms pivot, each one of the pair of gliding assemblies including:
      a gliding body slidably supported on the frame of the vehicle; and
      a cylinder connected to the gliding body and movable under fluid pressure in opposite directions parallel to the length of the container, the cylinder defining a first end and a second end;
   a fluid circuit configured to selectively supply pressurized fluid from a source of pressurized fluid to one of the first end of a first cylinder and to the second end of a second cylinder of the other of the pair of guiding assemblies, the fluid circuit including;
      a fluid line connecting the second end of the first cylinder to the first end of the second cylinder and configured to direct pressurized fluid between the first cylinder and the second cylinder such that a first flow of the pressurized fluid to the first end of the first cylinder causes movement of both cylinders, and therefore the gliding bodies and bail arms supported thereon, in a first direction along the length of the vehicle frame, and such that a second flow of pressurized fluid to the second end of the second cylinder causes movement of both cylinders, and therefore the gliding bodies and bail arms supported thereon, in a second direction opposite the first direction;
      a first check valve associated with the first cylinder; and
      a second check valve associated with the second cylinder,
      wherein the first and second check valves are configured to open as a result of a pressure differential between the first and second cylinders, and are configured to equalize the fluid pressure of the cylinders such that each cylinder travels an equal distance along the length of the vehicle frame, and
      wherein the first check valve is configured to open such that the pressurized fluid bypasses the first cylinder and the second check valve is configured to open such that the pressurized fluid bypasses the second cylinder.

2. The cover system of claim 1, wherein the fluid circuit includes a solenoid valve configured to direct pressurized fluid to the first cylinder or to the second cylinder of the pair of gliding assemblies.

3. The cover system of claim 1, wherein:
   in response to the first flow of pressurized fluid, the first and second cylinders are configured to travel a first distance in the first direction;
   the pressure differential is caused by the first cylinder traveling the first distance before the second cylinder travels the first distance; and
   the first check valve opens to allow the pressurized fluid to flow through the fluid line to the second cylinder until the second cylinder travels the first distance.

4. The cover system of claim 1, further comprising:
   a reservoir tank, wherein:
   in response to the first flow of pressurized fluid, the first and second cylinders are configured to travel a first distance in the first direction;
   the pressure differential is caused by the second cylinder traveling the first distance before the first cylinder travels the first distance; and
   the second check valve opens to allow the pressurized fluid to flow to the reservoir tank until the first cylinder travels the first distance.

5. The cover system of claim 3, wherein the first and second cylinders are configured to travel the first distance between a pair of stops.

6. The cover system of claim 4, wherein the first and second cylinders are configured to travel the first distance between a pair of stops.

7. The cover system of claim 1, wherein:
   in response to the second flow of pressurized fluid, the first and second cylinders are configured to travel a second distance in the second direction;

the pressure differential is caused by the first cylinder traveling the second distance before the second cylinder travels the second distance; and the first check valve opens to allow the pressurized fluid to flow through the fluid line to the second cylinder until the second cylinder travels the second distance.

8. The cover system of claim 1, further comprising:

a reservoir tank, wherein:

in response to the second flow of pressurized fluid, the first and second cylinders are configured to travel a second distance in the second direction;

the pressure differential is caused by the second cylinder traveling the second distance before the first cylinder travels the second distance; and the second check valve opens to allow the pressurized fluid to flow to the reservoir tank until the first cylinder travels the second distance.

9. The cover system of claim 7, wherein the first and second cylinders are configured to travel the second distance between a pair of stops.

10. The cover system of claim 8, wherein the first and second cylinders are configured to travel the second distance between a pair of stops.

\* \* \* \* \*